(12) United States Patent
Jayasudha et al.

(10) Patent No.: US 9,507,692 B2
(45) Date of Patent: Nov. 29, 2016

(54) DOWNWARD PROPAGATION OF RESULTS FOR TEST CASES IN APPLICATION TESTING

(75) Inventors: Yedalla Jayasudha, Hyderabad (IN); Kalyani Subramanyan, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 889 days.

(21) Appl. No.: 12/424,321

(22) Filed: Apr. 15, 2009

(65) Prior Publication Data

US 2010/0268502 A1    Oct. 21, 2010

(51) Int. Cl.
| | |
|---|---|
| G01N 37/00 | (2006.01) |
| G01R 31/00 | (2006.01) |
| G01R 31/14 | (2006.01) |
| G01D 1/00 | (2006.01) |
| G06F 15/00 | (2006.01) |
| G06F 11/36 | (2006.01) |
| G06F 11/07 | (2006.01) |
| G05B 23/02 | (2006.01) |

(52) U.S. Cl.
CPC ........... G06F 11/3672 (2013.01); G05B 23/02 (2013.01); G06F 11/0766 (2013.01)

(58) Field of Classification Search
CPC ........... G06F 11/3672; G06F 11/0766; G06F 11/263; G06F 11/3409; G05B 23/02; H01L 22/20; G01R 31/2894; G01R 31/31908; G07C 3/14
USPC ............ 702/81–83, 119, 120, 122, 123, 182, 702/183; 717/124, 126; 715/700
See application file for complete search history.

(56) References Cited

U.S. PATENT DOCUMENTS

| | | | |
|---|---|---|---|
| 6,415,396 B1 | 7/2002 | Singh et al. | |
| 6,431,875 B1 | 8/2002 | Elliott et al. | |
| 6,643,266 B1 | 11/2003 | Pugaczewski | |
| 7,020,699 B2 | 3/2006 | Zhang et al. | |
| 7,315,973 B1* | 1/2008 | Wise | G01B 31/31836 703/14 |
| 2003/0070120 A1* | 4/2003 | Michael | G06F 11/3684 714/38.14 |
| 2006/0179363 A1* | 8/2006 | LaBanca et al. | 714/57 |
| 2007/0132477 A1* | 6/2007 | Balog et al. | 324/765 |
| 2008/0072100 A1 | 3/2008 | Okada | |
| 2008/0270841 A1* | 10/2008 | Quilter | 714/38 |
| 2008/0282226 A1 | 11/2008 | Connally et al. | |
| 2008/0313006 A1* | 12/2008 | Witter | G06Q 10/06311 705/7.17 |
| 2010/0058295 A1* | 3/2010 | Johnson et al. | 717/124 |
| 2012/0131387 A1* | 5/2012 | Salloum et al. | 714/38.1 |

(Continued)

OTHER PUBLICATIONS

Binnig, Carsten; et al., "Towards Automatic Test Database Generation", IEEE 2008; 8 pages.

(Continued)

*Primary Examiner* — Michael Nghiem
(74) *Attorney, Agent, or Firm* — Trellis Intellectual Property Law Group, PC (57) ABSTRACT

A test case for the application under test is determined for the quality assurance application where results for a test case can be received from a user. An interface is displayed to allow the user to enter a pass or fail indication for a manual test that has been performed for the test case. If a pass indication is received for the test case, the test case is marked as passed. Also, in response to receiving the pass indication for the test case, a plurality of steps for the test case are automatically marked as passed. If a fail indication is received for the test case, a request for the user to identify a step that failed the manual test is output. When the response indicating which step failed is received, that step is marked as failed.

19 Claims, 5 Drawing Sheets

(56) References Cited

U.S. PATENT DOCUMENTS

2012/0253728 A1* 10/2012 Chamas .............. G06F 11/2294
702/109

OTHER PUBLICATIONS

Binnig, Carsten; et al., "Towards Automatic Test Database Generation", IEEE, Copyright 2008; 8 pages.

Sai-ngern, Sittisak; et al., "An Address Mapping Approach for Test Data Generation of Dynamic Linked Structures", available online at www.sciencedirect.com; Copyright 2004; pp. 199-214.

"Unit Testing with Silverlight", obtained at http://weblogs.asp.net/scottgu/archive/2008/04/02/unit-testing-with-silverlight.aspx; Apr. 2, 2008; 11 pages.

Fajardo, Jose, et al.; "Testing SAP R/3" Copyright 2007, Table of Contents and p. 289; obtained at Amazon.com.

* cited by examiner

| Step No | Step Name | Status | Reason | Select |
|---------|-----------|--------|--------|--------|
| 1 | Step 1 | Pass ▼ | Reason | |
| 2 | Step 2 | Pass ▼ | | |
| 3 | Step 3 | Pass ▼ | Reason | |
| | | Submit  Cancel | | |

*Fig. 6*

| Step No | Step Name | Status | Reason | Select |
|---------|-----------|--------|--------|--------|
| 1 | Step 1 | No Run | | |
| 2 | Step 2 | No Run | | |
| 3 | Step 3 | No Run | | |
| | | Submit  Cancel | | |

*Fig. 7A*

| Step No | Step Name | Status | Reason | Select |
|---------|-----------|--------|--------|--------|
| 1 | Step 1 | Pass ▼ | | |
| 2 | Step 2 | Fail ▼ | Reason #1 | |
| 3 | Step 3 | No Run | | |
| | | Submit  Cancel | | |

*Fig. 7B*

DOWNWARD PROPAGATION OF RESULTS FOR TEST CASES IN APPLICATION TESTING

BACKGROUND

Particular embodiments generally relate to testing of applications.

An application is tested to determine if it meets quality standards. For example, multiple test cases may be used to test different aspects of the application. These test cases may include multiple steps that are performed to test the application.

A user may use a quality assurance application to aggregate the results of the test cases. For example, an application may require many different test cases that are performed by many different quality assurance engineers. Each quality assurance engineer needs to enter the results for each test case in the quality assurance application.

Two different methods have been provided for a user to update test results in the quality assurance application. In a fast run, a user can mark a test case as pass or fail. However, the test steps for the test case remain with a value of "no run." This may be problematic because reports may be run that use the results of a test step. However, if the test steps have the value of "no run" then these reports do not show an accurate picture of the test results. Also, any other information cannot be recorded for the test steps when the fast run method is used.

A normal run method may also be used to update the test steps. In this case, the test case is not marked as pass or fail, but the test steps are marked individually. The user has to mark each test step as pass or fail and can also enter in other information for reasons for the pass or fail. Typically, there are a large number of test cases in a test cycle. For example, if there are 5000 test cases, with each test case including ten steps, this means 50,000 steps need to be updated. This is a considerable amount of time spent recording test results.

SUMMARY

Particular embodiments generally relate to a quality assurance application that can be used to record test results for an application under test. A test case for the application under test is stored in the quality assurance application where results for a test case can be received from a user. An interface is displayed to allow the user to enter a pass or fail indication for a manual test that has been performed for the test case. The manual test is a test that was manually performed on the application under test by the user. If a pass indication is received for the test case, the test case is marked as passed. Also, in response to receiving the pass indication for the test case, a plurality of steps for the test case are automatically marked as passed. If a fail indication is received for the test case, a request for the user to identify a step that failed the manual test is output. When the response indicating which step failed is received, that step is marked as failed. The pass or fail indication from the test case and steps are then stored.

A further understanding of the nature and the advantages of particular embodiments disclosed herein may be realized by reference of the remaining portions of the specification and the attached drawings.

DETAILED DESCRIPTION OF EMBODIMENTS

Figure 1:
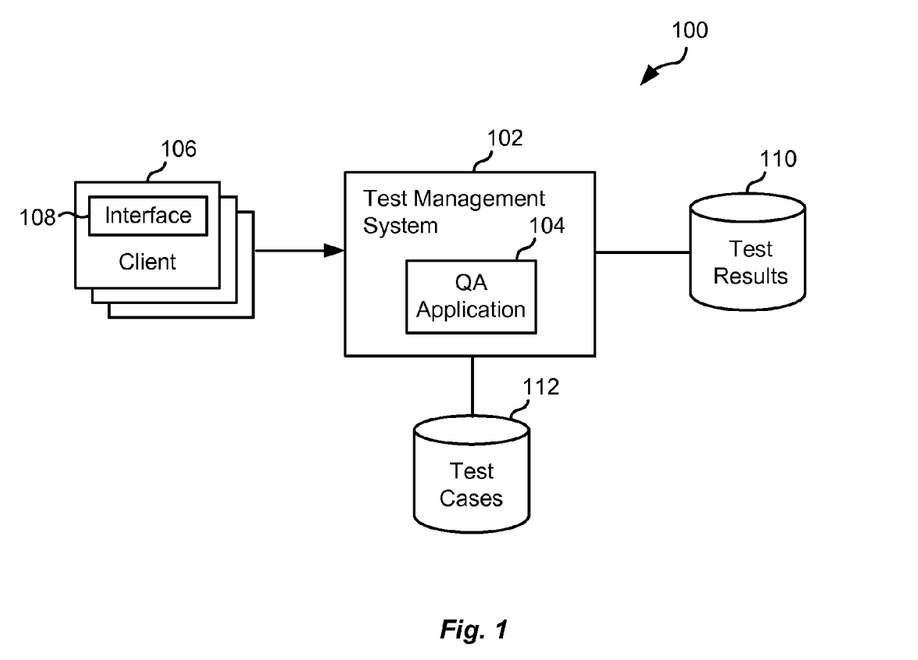
FIG. 1 depicts an example of a system for providing a quality assurance application according to one embodiment.

FIG. 1 depicts an example of a system 100 for providing a quality assurance application according to one embodiment. As shown, a test management system 102 includes a quality assurance application 104. Also, a plurality of clients 106 may be used to interact with test management system 102. Users may use an interface 108 to record results for an application under test.

Test management system 102 may include one or more computing devices. Multiple users may log into test management system 102 to update results after test cases have been executed during testing. Test management system 102 allows the entering in of results for manual testing. Manual testing is where a user manually tests an application under test. The manual testing may involve a user interacting with the application under test to perform test steps. The user then notes if the test step passed or failed. In another embodiment, test management system 102 may also perform automatic testing, which is where an application is tested by running automated scripts.

Clients 106 may be any computing devices used by a user to log in to test management system 102. An interface 108 provides various user interfaces that can be used by a user to enter in test results. For example, a user can enter in a pass for a test case and all test steps for the test case can be marked as passed automatically. This process will be described in more detail below.

A quality assurance application 104 is configured to record the results for the user. Quality assurance application 104 may provide menus that allow a user to enter in the pass or fail indication and also to provide additional information, such as reasons for the pass and/or fail. Quality assurance application 104 may be used by multiple users to aggregate test results for any number of applications under test.

Test results may be stored in a database 110. Also, information for the test cases may be stored in a database 112. It should be noted that database 110 and 112 may be any form of storage and test cases and results may be stored in any number of devices. In one embodiment, databases 110 and 112 are connected to test management system 102 through a network. Data is communicated through the network to system 102 in this case.

When a user wants to enter in results for a test case, interface 108 is used to access quality assurance application 104. A test case may be selected from interface 108. Data for that test case is then loaded from storage 112. In one embodiment, data for all other test cases is not loaded into memory of test management system 102. Rather, only the data for the selected test case is loaded into memory, which may be local memory (e.g., cache, hard drive) for a computer. The local memory allows faster access to the data for the test case as compared to accessing database 112. The data may be loaded onto test management system 102 and/or client 106.

A user may decide to assign a pass or fail indication to a test case. If the test case is marked as passed, then the steps for the test case are automatically marked as passed in response to receiving the pass indication for the test case. Thus, a downward propagation of the pass indication is performed automatically. Because the steps of the test case are marked as passed, the user does not have to mark the steps as passed. This provides a reduction in the number of updates a user has to perform. Also, if a user wants to enter in a reason for the pass, the user does not have to mark all the steps as passed. Conventionally, if the user had wanted to enter in a reason for a test step, the user would have to have marked all the test steps as passed. This is because the use would have to enter the manual run mode, which requires the user to manually enter in all the results for the steps. If the test case is marked as failed, it is requested that the user mark at least one of the test steps as failed and also provide a reason.

Figure 2:
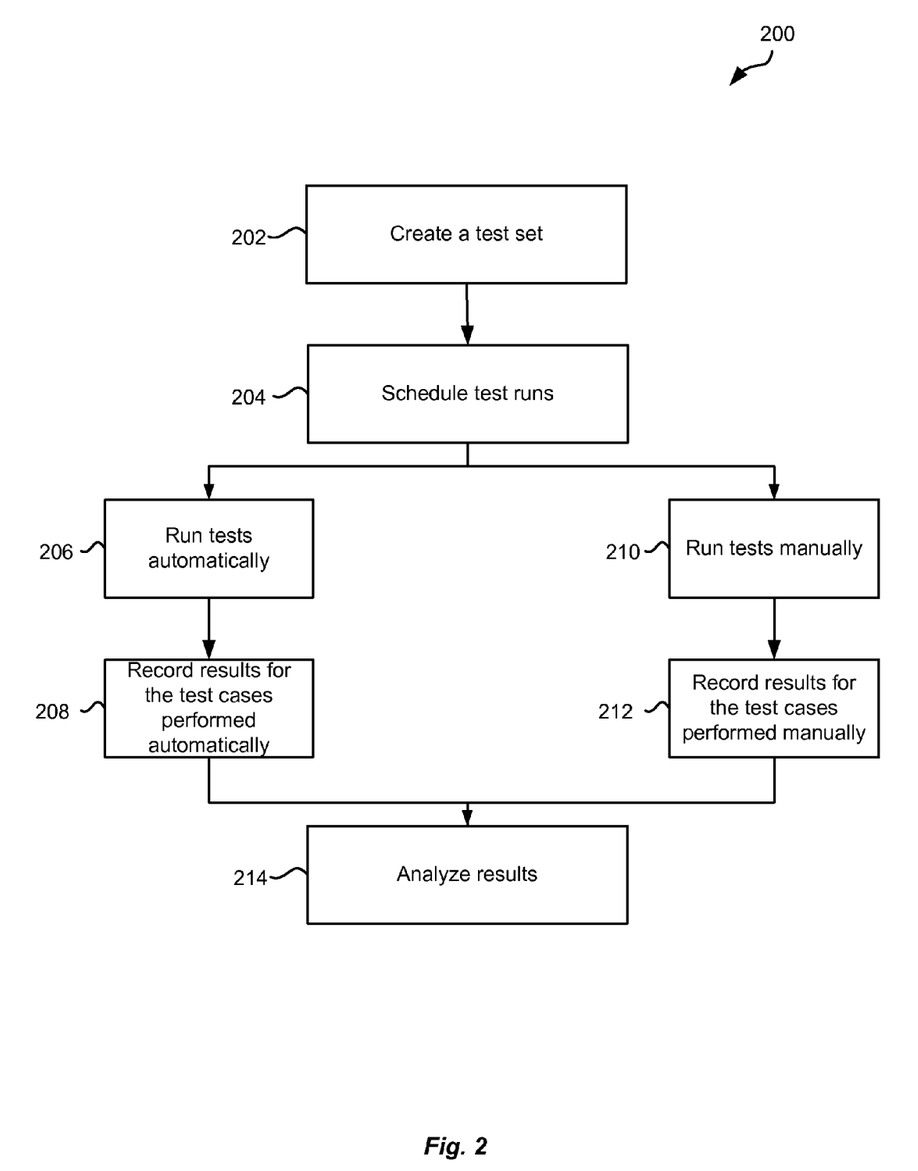
FIG. 2 depicts a simplified flow chart of a method for providing quality assurance testing according to one embodiment.

An overview of the testing process will now be described. FIG. 2 depicts a simplified flow chart 200 of a method for providing quality assurance testing according to one embodiment. In step 202, test management system 102 may create a test set. The test set includes a collection of test cases and steps. A test case is a collection of steps for any scenario, such as a flow of execution. The steps include detailed information on how the test steps should be performed to test an application under test.

In step 204, test runs are scheduled. For example, the test runs may be automatic tests or manual tests. In step 206, tests may be run automatically. For example, test management system 102 may run automated scripts to test the application under test. This may be done without any human intervention. For example, inputs may be automatically entered into an application under test based on the steps of a step case and results may be recorded by quality assurance application 104. This may record results automatically. In step 208, the results for the test cases performed automatically are recorded. For example, the test case may be marked as pass or fail. Additionally, the steps may be marked as pass or fail. This is an automatic update that is performed by quality assurance application 104.

Figure 3:
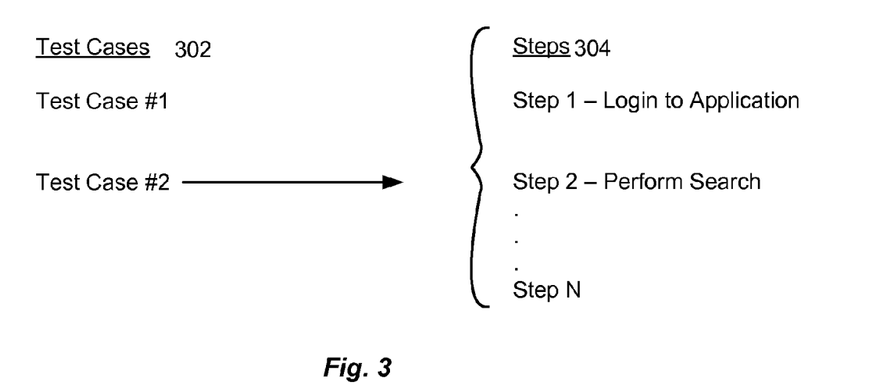
FIG. 3 shows an example of different test cases for an application under test.

In step 210, the tests may be run manually. For example, test management system 102 may output the test case and steps that need to be performed. FIG. 3 shows an example of different test cases for an application under test. As shown, a plurality of test cases 302 is provided to test an application. Each test case includes a plurality of steps. For example, a test case #2 is expanded to show N steps. Each step includes instructions on how to test the application. For example, a step #1 may be to log in to the application. Step #2 may be to perform a search using a certain search term. The other steps may include other operations that need to be performed for using the application.

A user may then use the outputted information to run the tests manually. For example, the application under test is manually tested by the user based on the steps. In this case, the user may perform a series of operations with the application under test. Each operation may have an expected result that should be observed. The user then may record which of the steps passed or failed. For example, a user may run a step using the application under test and determine whether the result of the step conforms to an expected result.

In step 212, results entered manually by a user are received and stored by quality assurance application 104. This process will be described in more detail below.

In step 214, the results may be analyzed. For example, test management system 102 may use the results to generate the reports. For example, the pass or fail indication for the test cases and/or the steps may be used to generate the reports.

Figure 4:
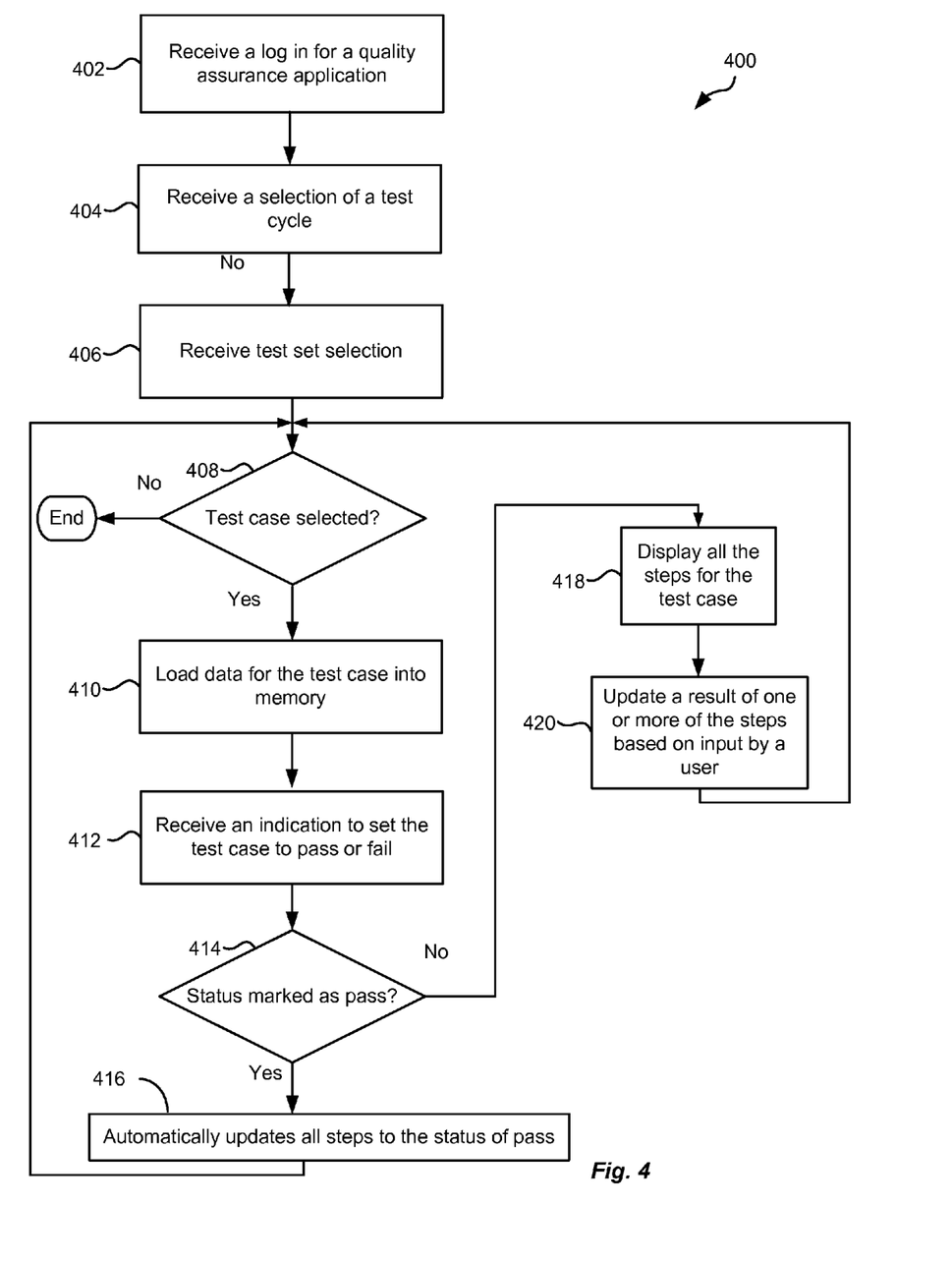
FIG. 4 depicts a simplified flowchart for a method for receiving results for a manually run test according to one embodiment.

The process flow for receiving results for a manually run test will now be described in more detail. FIG. 4 depicts a simplified flowchart 400 for a method for receiving results for a manually run test according to one embodiment. In step 402, test management system 102 receives a log in for a quality assurance application 104. Different users may log in to enter results. In step 404, a selection of a test cycle is received. A test cycle is a folder that contains the test sets. In step 406, a test set selection is received. The test set may include a number of test cases.

In step 408, it is determined if a test case has been selected to update. If not, the process ends. If a test case has been selected, in step 410, data for that test case is loaded into memory. As mentioned above, a subset of the data is being loaded into memory instead of the entire dataset for the test set. This requires less memory to manipulate the data and also less communication to transfer data from database 112 to memory. In one embodiment, data for the test case selected and not other test cases in the test set is loaded into memory.

Figure 5:
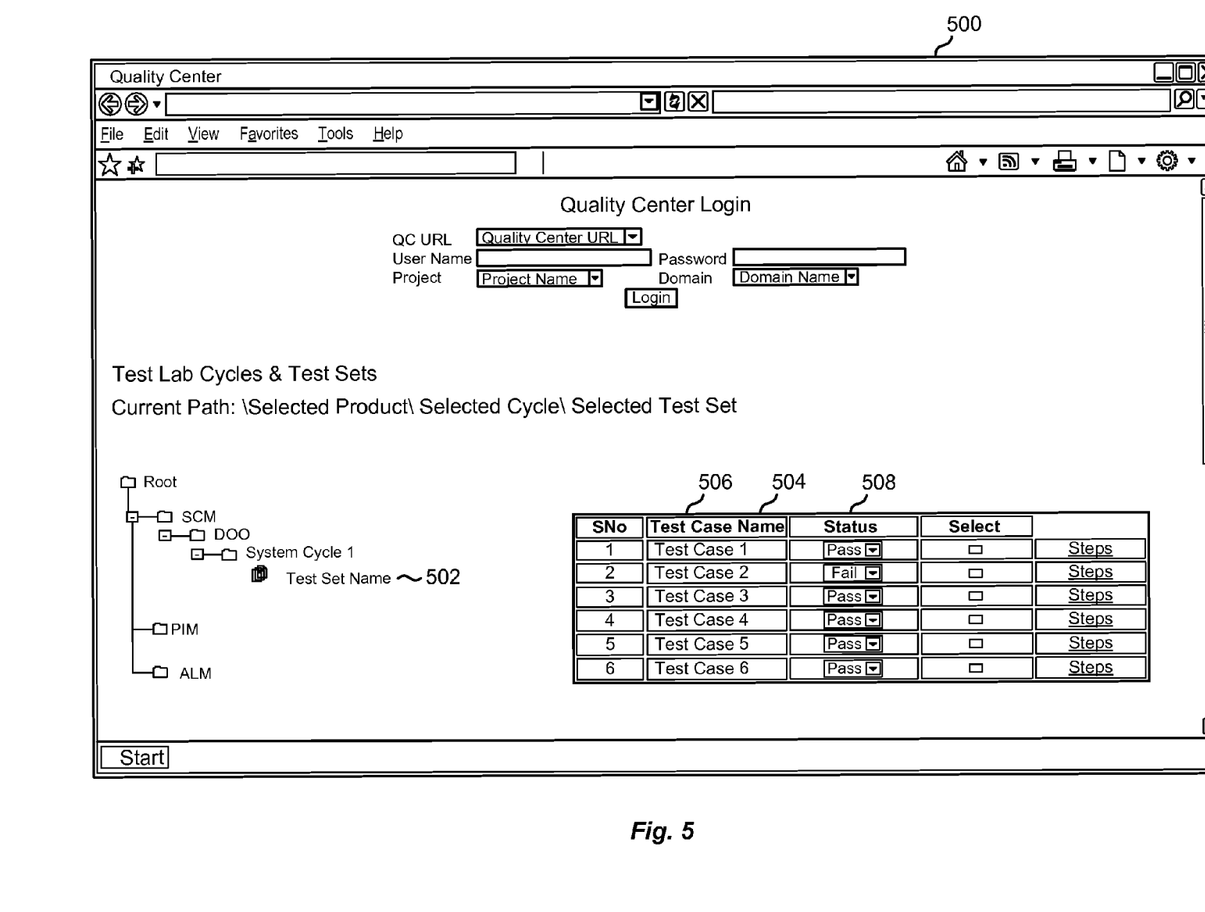
FIG. 5 depicts an example interface that may be used to set the test case to pass or fail.

In step 412, an indication to set the test case to pass or fail is received. For example, the user may use an interface to set the test case to pass or fail. FIG. 5 depicts an example interface 500 that may be used to set the test case to pass or fail. As shown, a test set 502 has been selected. This is in the system cycle 1.

A summary column 506 of the test cases is shown in a table 504. A status column 508 allows a user to enter a pass or fail indication. As shown, a drop down menu allows a user to toggle between a pass or fail indication. It will be understood that other methods of allowing a user to enter in a pass or fail indication may be used, such as the user may type in pass or fail or may select a toggle button.

Figure 6:
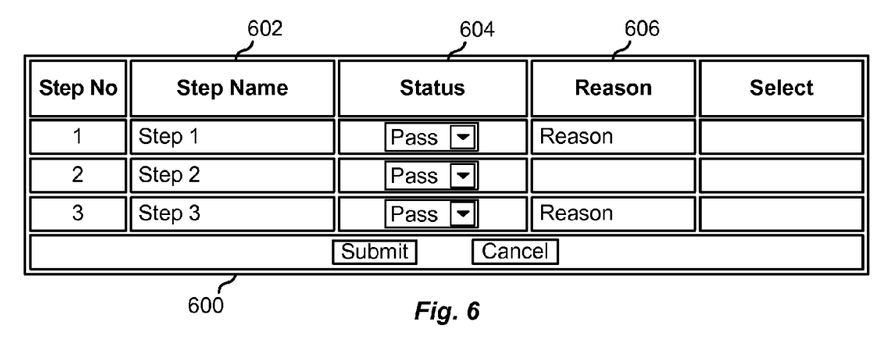
FIG. 6 depicts an example of an interface that shows the automatic update of test steps.

In step 414, quality assurance application 104 checks the status that is received. If the status is pass, in step 416, quality assurance application 104 automatically updates all steps to the status of pass. FIG. 6 depicts an example of an interface that shows the automatic update. As shown, a table 600 lists the steps in a step name column 602. The status has been changed to pass in a status column 604. Also, a user may enter in a reason for the pass in a reason column 606. The reason may indicate some information about the test that was performed.

Figure 7A:
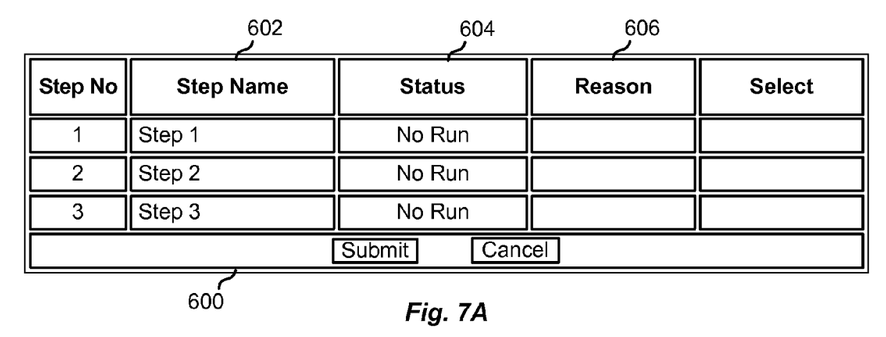
FIG. 7A depicts an example of an interface showing the steps that are displayed for a test case.

If the status was marked as fail in step 418, all the steps for the test case are displayed. FIG. 7A depicts an example of the steps that are displayed. As shown, an interface 700 has the status for each step as no run. In this case, it is desirable for a user to input which steps have failed. A user may then input which step or steps failed. Also, a reason may be provided in reason column 606.

Figure 7B:
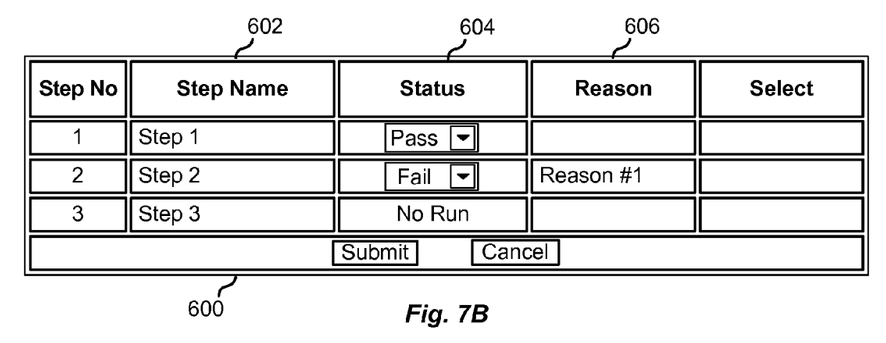
FIG. 7B shows an interface where a user has inputted a fail indication and a reason for the failure according to one embodiment.

Referring back to FIG. 4, in step 420, a result of one or more of the steps is updated based on input by a user. For example, some of the steps may be marked as pass and some steps may be marked as fail. Reasons may also be entered. FIG. 7B shows an interface where a user has inputted a fail indication in a step 702 and a reason for the failure according to one embodiment. Also, the user has marked the previous steps as pass. After the failure, the user may have decided that to stop the test and thus these steps are marked as no run.

The process then reiterates back to step 408 to determine if a test case should be updated again. If not, the results have been updated, they may be stored. For example, the data may be stored in database 110.

Reports may be run based on the inputted test results. For example, a user may want to determine statistics for the application under test. The reports may pull information for the steps of the test case. In one example, the report may need to determine if certain steps of a test case passed or failed. Because a user could enter a pass for the test case and the pass is propagated through all steps, accurate results for the test case may be determined. For example, if the report needed to pull the status for step #2 of test case #2, it will be marked as pass. Conventionally, if the user had marked test case #2 as pass, the status for the individual steps would have been kept as no run. If the status was pulled as no run, the report may not be accurate in reporting that step #2 had the status of no run. However, using particular embodiments, the pass indication is propagated to step #2 and it is properly accounted for in the report.

Particular embodiments provide many advantages. For example, an improvement in performance is provided because only a subset of the data is loaded into memory, such as just the test case selected. This provides faster manipulation of the data in addition to less communication costs to transfer the data from database 112. Also, less computing resources are needed to dynamically generate and maintain an in-memory representation of the subset of data.

The number of steps that need to be updated is also reduced. If there are 1500 users accessing a database 112 of approximately 300,000 test cases with each test case having approximately 10 steps, there are about 3,000,000 test steps to be updated. However, particular embodiments reduce the amount of time that users have to update the test steps. If all test cases pass the test execution, particular embodiments bring down the reporting time ten times. This provides shorter testing cycles because a considerable amount of time is saved in entering in the reporting activity. This may bring products to market faster.

Although the description has been described with respect to particular embodiments thereof, these particular embodiments are merely illustrative, and not restrictive. Although testing of applications is described particular embodiments may be used to enter in test results for other tests performed.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method performed by a processor, the method comprising:
   using the processor configured for:
   obtaining a test set which includes a plurality of test cases for an application;
   loading a test case from the test set into local memory and not loading into the local memory other test cases from the test set for an application under test using a quality assurance application, the quality assurance application being configured to allow results for one or more test cases for the application under test to be received, wherein the test case includes a plurality of steps;
   configuring a first processing path and a second processing path, wherein the first processing path includes a manual testing processing path having an automated downward propagation marking process and a manual marking process, and the second processing path includes an automated testing path process configured to process the test case without human intervention;
   performing the step of obtaining the test set and the step of loading the test case;
   upon manually testing the test case using the manual testing processing path, providing a selection from a user to set a pass indication or a fail indication for the test case;
   if the pass indication is received for the test case, performing:
   marking the test case as passed;
   using the automated downward propagation marking process to automatically mark the plurality of steps as passed;

if the fail indication is received for the test case, performing:
  stopping the manual testing of the test case;
  leaving at least some of the plurality of steps as untested steps;
  marking the test case as failed;
  displaying the plurality of steps;
  based on user input, marking results of at least one of the plurality of steps as fail;
  based on the user input, entering a reason for the fail;
  marking at least some of the untested steps as no run; and
  storing at least some of the marked results with the test case and the plurality of steps.

2. The method of claim 1, wherein if the fail indication is received for the test case, performing:
  outputting a request for the user to identify the fail of at least one step from the plurality of steps; and
  in response to receiving the fail for the at least one step of the plurality of steps, marking the at least one step from the plurality of steps as fail.

3. The method of claim 1, further comprising:
  allowing the user to enter in a comment for a step in the plurality of steps if the test case passed, wherein the step is automatically marked as passed.

4. The method of claim 1, further comprising:
  receiving a request for opening the test case in the quality assurance application configured to manage the loading of the test case into the local memory and not loading into the local memory the other test cases from the test set.

5. The method of claim 1, wherein the plurality of steps are marked as passed without receiving a second input indicating any of the plurality of steps should be marked as passed.

6. The method of claim 1, wherein the test case includes a test case field in which the pass or fail indication is marked and each of the plurality of steps includes a step field in which each step is marked with a pass, or the fail, or the no run, wherein the test case field and the step fields are all marked as pass when the pass indication for the test case is received.

7. The method of claim 1, wherein prior to receiving the pass indication or the fail indication for the test case the user performing at least one manual test of the test case causing at least one operation to be performed by the test case.

8. The method of claim 1, wherein the plurality of steps include operations to be performed by the user and expected results that are used to determine if the steps passed or failed when the manual testing is performed.

9. The method of claim 1, further comprising:
  running a report using at least a portion of stored pass indications for test case steps marked as passed; and
  storing the report for display thereof.

10. A non-transitory computer-readable medium comprising encoded logic for execution by one or more processors, the logic when executed operable to:
  obtain a test set which includes a plurality of test cases for an application;
  load a test case from the test set into local memory and not loading into the local memory other test cases from the test set for an application under test using a quality assurance application, the quality assurance application being configured to allow results for one or more test cases for the application under test to be received, wherein the test case includes a plurality of steps;
  configure a first processing path and a second processing path, wherein the first processing path includes a manual testing processing path having an automated downward propagation marking process and a manual marking process, and the second processing path includes an automated testing path process configured to process the test case without human intervention;
  perform the step of obtaining the test set and the step of loading the test case;
  upon manually testing the test case using the manual testing processing path, provide a selection from a user to set a pass indication or a fail indication for the test case;
  if the pass indication is received for the test case, perform:
    mark the test case as passed;
    use the automated downward propagation marking process to automatically mark the plurality of steps as passed;
  if the fail indication is received for the test case:
    stop the manual testing of the test case;
    leave at least some of the plurality of steps as untested steps;
    mark the test case as failed;
    display the plurality of steps;
    based on user input, mark results of at least one of the plurality of steps as fail;
    based on the user input, enter a reason for the fail;
    mark at least some of the untested steps as no run; and
    store at least some of the marked results with the test case and the plurality of steps.

11. The non-transitory computer-readable medium of claim 10, wherein if the fail indication is received for the test case, wherein the logic is further operable to:
  output a request for the user to identify the fail of the at least one step from the plurality of steps; and
  in response to receiving the fail for the at least one step from the plurality of steps, mark the at least one step from the plurality of steps as fail.

12. The non-transitory computer-readable medium of claim 10, wherein the logic is further operable to allow the user to enter in a comment for a step in the plurality of steps if the test case passed, wherein the step is automatically marked as passed.

13. The non-transitory computer-readable medium of claim 10, wherein the logic is further operable to:
  receive a request for opening the test case in the quality assurance application configured to manage the loading of the test case into the local memory and not loading into the local memory the other test cases from the test set.

14. The non-transitory computer-readable medium of claim 10, wherein the plurality of steps are marked as passed without receiving a second input indicating any of the plurality of steps should be marked as passed.

15. The non-transitory computer-readable medium of claim 10, wherein the test case includes a test case field in which the pass or fail indication is marked and each of the plurality of steps includes a step field in which each step is marked with a pass, or the fail, or the no run, wherein the test case field and the step fields are all marked as pass when the pass indication for the test case is received.

16. The non-transitory computer-readable medium of claim 10, wherein prior to receiving the pass indication or the fail indication for the test case the user performs at least one manual test step of the test case causing at least one operation to be performed by the test case.

17. The non-transitory computer-readable medium of claim 10, wherein the plurality of steps include operations to be performed by the user and expected results that are used to determine if the steps passed or failed when the manual testing is performed.

18. The non-transitory computer-readable medium of claim 10, wherein the logic is further operable to:
   run a report using at least a portion of stored pass indications for test case steps marked as passed; and
   store the report for display thereof.

19. An apparatus comprising:
   one or more processors; and
   logic encoded in one or more tangible media for execution by the one or more processors and when executed operable to:
   obtain a test set which includes a plurality of test cases for an application;
   load a test case from the test set to load into local memory and not loading into the local memory other test cases from the test set for an application under test using a quality assurance application, the quality assurance application being configured to allow results for one or more test cases for the application under test to be received, wherein the test case includes a plurality of steps;
   configure a first processing path and a second processing path, wherein the first processing path includes a manual testing processing path having an automated downward propagation marking process and a manual marking process, and the second processing path includes an automated testing path process configured to process the test case without human intervention;
   perform the step of obtaining the test set and the step of loading the test case;
   upon manually testing the test case using the manual testing processing path,
   provide a selection from a user to set a pass indication or a fail indication for the test case;
   if the pass indication is received for the test case, perform:
      mark the test case as passed;
      using the automated downward propagation marking process to automatically mark the plurality of steps as passed;
   if the fail indication is received for the test case:
      stop the manual testing of the test case;
      leave at least some of the plurality of steps as untested steps;
      mark the test case as failed;
      display the plurality of steps;
      based on user input, mark results of at least one of the plurality of steps as fail;
      based on the user input, enter a reason for the fail;
      mark at least some of the untested steps as no run; and
      store at least some of the marked results with the test case and the plurality of steps.

* * * * *